United States Patent
Herzig et al.

(10) Patent No.: US 7,888,446 B2
(45) Date of Patent: Feb. 15, 2011

(54) ORGANOPOLYSILOXANES AND METHOD FOR THE PRODUCTION THEREOF

(75) Inventors: Christian Herzig, Waging (DE); Hans Lautenschlager, Haiming (DE)

(73) Assignee: Wacker Chemie AG, Munich (DE)

( * ) Notice: Subject to any disclaimer, the term of this patent is extended or adjusted under 35 U.S.C. 154(b) by 380 days.

(21) Appl. No.: 12/063,312

(22) PCT Filed: Aug. 9, 2006

(86) PCT No.: PCT/EP2006/065168

§ 371 (c)(1),
(2), (4) Date: Feb. 8, 2008

(87) PCT Pub. No.: WO2007/023084

PCT Pub. Date: Mar. 1, 2007

(65) Prior Publication Data

US 2010/0137544 A1    Jun. 3, 2010

(30) Foreign Application Priority Data

Aug. 25, 2005    (DE) .................. 10 2005 040 323

(51) Int. Cl.
 *C08G 77/00* (2006.01)
(52) U.S. Cl. ............................ 528/10; 528/15
(58) Field of Classification Search ............ 528/10
See application file for complete search history.

(56) References Cited

U.S. PATENT DOCUMENTS

| | | | |
|---|---|---|---|
| 4,849,491 A | 7/1989 | Ogawa et al. | |
| 4,886,865 A | 12/1989 | Ikeno et al. | |
| 5,166,295 A * | 11/1992 | Herzig | 528/15 |
| 5,691,435 A | 11/1997 | Herzig et al. | |
| 6,034,225 A | 3/2000 | Weidner et al. | |
| 6,252,100 B1 | 6/2001 | Herzig | |
| 6,414,175 B1 | 7/2002 | Burkhart et al. | |
| 7,659,357 B2 * | 2/2010 | Nakata et al. | 528/10 |
| 2004/0126504 A1 | 7/2004 | Ouchi et al. | |
| 2005/0089642 A1 | 4/2005 | Adams et al. | |
| 2005/0165197 A1 * | 7/2005 | Ogihara et al. | 528/32 |

FOREIGN PATENT DOCUMENTS

| | | |
|---|---|---|
| EP | 0786463 A1 | 7/1997 |
| EP | 0868470 B1 | 10/1999 |
| EP | 1037937 B1 | 5/2003 |
| JP | 6107949 A | 4/1994 |
| JP | 2001049120 A | 2/2001 |

OTHER PUBLICATIONS

Patent Abstract Corresponding to JP6107949.
Abstract corresponding to: Kosakai et al., Silicon Compounds as Crosslinking Agents or as Intermediates for Polymer Modifiers, 1995, American Chemical Society, vol. 10, No. 123.

* cited by examiner

*Primary Examiner*—Randy Gulakowski
*Assistant Examiner*—Lindsay Nelson
(74) *Attorney, Agent, or Firm*—Brooks Kushman P.C.

(57) ABSTRACT

An organopolysiloxane compound containing per molecule at least one structural unit of the general formula $$O_{3-a/2}R_aSi-Y(SiR_aO_{3-a/2})_b \quad (I)$$

where
R can be identical or different and denotes a monovalent SiC-bonded organic radical which has 1 to 30 C atoms and may contain one or more N and/or O atoms,
Y is a divalent to dodecavalent organic radical which has 1 to 30 C atoms and may contain one or more O atoms,
a is 0 or 1, and
b is an integer from 1 to 11.

15 Claims, No Drawings

ORGANOPOLYSILOXANES AND METHOD FOR THE PRODUCTION THEREOF

CROSS-REFERENCE TO RELATED APPLICATION

This application is the U.S. national phase of PCT Appln. No. PCT/EP2006/065168 filed Aug. 9, 2006 which claims priority to German application DE 10 2005 040 323.9 filed Aug. 25, 2005.

BACKGROUND OF THE INVENTION

1. Field of the Invention

The invention relates to organopolysiloxanes and to a process for preparing them.

EP 1037 937 B1 discloses processes for preparing organopolysiloxanes which contain structural units in which two $R_2Si$ units are joined to one another via a difunctional α,ω-alkanediyl radical having 2 to 18 C atoms.

2. Description of the Related Art

EP 868 470 B1 describes organopolysiloxanes having aliphatically unsaturated radicals which include at least one unit of the formula $O_{1/2}R_2SiO_xYRSiO$ and also, where appropriate, $O_{1/2}R_2SiO_xYR_2SiO_{1/2}$ units. In the case of "x"=0 either a dialkylsiloxy unit is joined to an alkylsiloxy unit and/or two dialkylsiloxy units are joined to one another via the spacer Y. Y is a difunctional radical of the formula $—(CR^3{}_2)_n CHR^3—$, with $R^3$ being an aliphatically saturated hydrocarbon radical or being H, and n being zero or an integer from 1 to 7. Siloxane polymers with a spacer $O_{1/2}R_2SiYRSiO$ are also described in U.S. Pat. No. 4,886,865.

Organopolysiloxane compounds with active hydrogen in the form of H—Si compounds and also hydrocarbon bridges between two Si atoms are described in EP 786 463 A1 and also JP 06 107 949 and U.S. Pat. No. 4,849,491.

SUMMARY OF THE INVENTION

The present invention relates to an organopolysiloxane compound containing per molecule at least one structural unit of the general formula

$$O_{3-a/2}R_aSi—Y(SiR_aO_{3-a/2})_b \qquad (I)$$

where

R can be identical or different and denotes a monovalent SiC-bonded organic radical which has 1 to 30 C atoms and may contain one or more N and/or O atoms, Y is a divalent to dodecavalent organic radical which has 1 to 30 C atoms and may contain one or more O atoms, a is 0 or 1, and b is an integer from 1 to 11.

DETAILED DESCRIPTION OF THE PREFERRED EMBODIMENT

The organopolysiloxanes of the present invention have the formula

$$O_{3-a/2}R_aSi—Y(SiR_aO_{3-a/2})_b \qquad (I)$$

where

R can be identical or different and denotes a monovalent SiC-bonded organic radical which has 1 to 30 C atoms and may contain one or more N and/or O atoms, Y is a divalent to dodecavalent organic radical which has 1 to 30 C atoms and may contain one or more O atoms, a is 0 or 1, and b is an integer from 1 to 11.

The term "organopolysiloxanes" is intended, in the context of the present invention, to embrace not only polymeric but also dimeric and oligomeric siloxanes.

Examples of R are saturated or unsaturated hydrocarbon radicals which may contain aromatic or aliphatic double bonds, e.g., alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical, isooctyl radicals such as the 2,2,4-trimethylpentyl radical, and the 2-ethylhexyl radical, nonyl radicals such as the n-nonyl radical, decyl radicals such as the n-decyl radical, dodecyl radicals such as then dodecyl radical, tetradecyl radicals such as the n-tetradecyl radical, hexadecyl radicals such as the n-hexadecyl radical, and octadecyl radicals such as the n-octadecyl radical, cycloalkyl radicals such as cyclopentyl, cyclohexyl, 4-ethylcyclohexyl, cycloheptyl, norbornyl, and methylcyclohexyl radicals, aryl radicals such as the phenyl, biphenyl, naphthyl, anthryl, and phenanthryl radicals; alkaryl radicals such as the o-, m-, and p-tolyl radicals, xylyl radicals, and ethylphenyl radicals; aralkyl radicals such as the benzyl radical, alkenyl radicals such as the 7-octenyl, 5-hexenyl, 3-butenyl, allyl, and vinyl radicals, and also the α- and the β-phenylethyl radical, ethers or polyethers, amines or polyamines which may contain primary, secondary or tertiary amino groups.

Preferably R is a methyl, ethyl, phenyl, allyl or a vinyl group, the methyl and the vinyl group being particularly preferred.

Preferably the ratio of the number of C atoms in Y to the valence of Y is not more than 10 and preferably not more than 5, and with particular preference not more than 3.

Y is preferably a linking organic unit having 1 to 24 C atoms between two to twelve siloxanyl units (Si atoms). Y is preferably divalent, trivalent or tetravalent, with particular preference divalent.

Examples of Y are the methylene group, the methine group or tetravalent carbon, the 1,1-ethanediyl and the 1,2-ethanediyl group, the 1,4-butanediyl and the 1,3-butanediyl group.

If Y contains at least 2 C atoms, this radical may also be unsaturated. Examples of such are the —CH=CH— group (cis or trans) and the

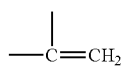

$$—\underset{|}{C}=CH_2$$

group, aim also the —C≡C— group.

With particular preference Y is an organic unit having not more than 12 C atoms, with greater preference having 2 C atoms. Examples of more particularly preferred radicals are —$CH_2CH_2$—, —$CH(CH_3)$—, —CH=CH—, —C(=$CH_2$)— or —C≡C—.

The organosiloxane compounds of the invention preferably contain structural elements of the general formula

$$R^1{}_cSiO_{4-c/2} \qquad (II)$$

where $R^1$ may be identical or different and denotes a monovalent SiC-bonded organic radical which has 1 to 30 C atoms and can contain one or more N and/or O atoms, and c is 0, 1, 2 or 3.

Examples of $R^1$ correspond to those stated for R, and c is preferably 2 or 3.

The organopolysiloxanes of the invention may vary in their viscosity over a wide range as a function of the number of structural units (I) and (II) per average molecule. Preference is given to the range from about 10 to about 10,000,000 mPa·s, the range from about 100 to about 100,000 mPa·s being particularly preferred.

The molecular ratio of the structural elements (II) to (I) is at least 2.0, preferably at least 10.0, and with particular preference at least 50.0.

Where R is an aliphatically unsaturated radical, its amount, based on the sum of the elements (I) and (II), is preferably not more than 5 meq./g.

The organopolysiloxanes of the invention can be prepared by any desired processes. One preferred process for preparing the compounds of the invention is the hydrolysis of compounds of the general formula (III)

$$X_{3-a}R_aSi-Y(SiR_aX_{3-a})_b \quad (III)$$

where X is a hydrolyzable group and R, Y, a, and b have the definition already stated.

Preferably X is a halogen group, acid group, or alkoxy group; with particular preference X is a chloro, acetate, formate, methoxy or ethoxy group.

Particular preference is given to a process in which there is a cohydrolysis of compounds of the general formula (III) with silanes of the general formula (IV)

$$R_cSiX_{4-c} \quad (IV)$$

where X denotes a hydrolyzable group and R and c have the definition already stated.

In general the corresponding products are readily manageable organosiloxanes which can be equilibrated in the typical processes/apparatus. As a result it is possible to prepare virtually any desired branched siloxane polymers.

The cohydrolysis is preferably performed by metering a mixture of the compounds (III) and (VI) into water or dilute acids with cooling. In the case of gaseous acids such as HCl, metering into a concentrated aqueous HCl solution is likewise sensible, if the acid liberated is to be recovered as a gas. Depending on the nature of the group X, the hydrolysis is strongly exothermic, and so cooling is needed. In order to avoid side reactions it is advantageous to hold the reaction temperature within the cool range, preferably at about 5 to 50° C. and with particular preference at about 10-25° C.

In the case of chlorosilanes the reaction times are very short, and so the time required to accomplish the process in batch operation depends primarily on the cooling performance. Alternatively the cohydrolysis of (III) and (VI) can also be accomplished continuously. Advantageous for the purpose of depleting residual acids is thorough washing with water, clean phase separation, and purification of the hydrolysis product under vacuum.

The mass ratio of the compounds (III) and (IV) is adapted to the intended molar ratio of the structural units (I) and (II) and commonly corresponds to the calculated values, since the cohydrolysis operates substantially without loss. The process can be accomplished under atmospheric pressure. Depending on the objective, however, higher or lower pressure is likewise practicable.

One preferred embodiment of the process is the preparation of inventive organopolysiloxanes in two stages: a cohydrolysis of the compounds (III) and (VI) in order to prepare a concentrate, followed by an equilibration of this concentrate with organopolysiloxanes which do not contain structural unit (I). It lies within the nature of the matter that, in cases of this kind, in the first stage, relatively low molar ratios of the structural elements (II) to (I) tend to be favorable, which are preferably below about 50. A higher molar ratio then comes about after the equilibration with organopolysiloxanes which do not contain structural units (I).

The organopolysiloxanes of the invention are branched, highly branched or virtually dendrimeric polymers which can be used wherever these types of structures offer advantages on account of their chemical and physical properties. Polymers containing vinyldimethylsiloxy end groups are used preferably for the formulation of rapid-crosslinking systems in accordance with the hydrosilylation principle. As a result of a relatively high degree of branching and associated increase in reactive groups per polymer molecule, crosslinking rates can be raised further. Polymers of the invention can therefore be used with advantage to prepare rapid-crosslinking addition systems, of the kind needed, in turn, to produce release coatings on papers and films.

The examples which follow serve for further illustration of the invention:

Example 1

A mixture of 109 g of redistilled 1,2-bis(methyldichlorosilyl)ethane (1.7 eq Cl) and 820 g of vinyldimethylchlorosilane (6.8 eq Cl) is cooled to 10° C. With stirring and simultaneous cooling, a total of 1.7 l of 5% strength HCl solution is metered in over about 80 minutes at a rate such that the temperature of the reaction mixture can be held at 10-20° C. Thereafter the mixture is stirred vigorously for 30 minutes, and then the phases are separated. The siloxane phase is washed with 4×1 l of water, neutralized with 0.5 l of 5% strength $NaHCO_3$ solution, and washed again with 1 l of water. Volatile hydrolysis products are separated off under vacuum at up to 80° C. (primarily divinyltetramethyldisiloxane). This gives 149.8 g of a clear liquid residue which has a viscosity of 7.2 mm²/s (25° C.) and, with an iodine number of 169.6, and has precisely one C═C double bond per 149.8 g. The end groups/branching unit ratio is 2.57. The product contains about 90% of the 1,2-bis(methyldichlorosilyl)ethane employed, in hydrolyzed form.

Example 2

Example 1 is repeated with the same raw materials, but using only 25% of the vinyldimethylchlorosilane (i.e., 205 g). Distillation of the volatile products this time gives 89.4 g of a clear oil residue whose viscosity is 25.4 mm²/s (25° C.).

Example 3

Example 2 is repeated in the same way with the same raw materials, using this time 436 g of 1,2-bis(methyl-dichlorosilyl)ethane (6.8 eq Cl). After metering of the HCl solution between 10 and 20° C., the highly viscous mixture is left to afterreact for 90 minutes with stirring. Identical workup produces a highly viscous crude product containing gel fractions. Following removal of volatile constituents, the turbid, highly viscous oil is dissolved in toluene, and gel fractions are removed by filtration. Removal of the solvent gives a clear oil having a viscosity of 9100 mm²/s (25° C.). The outcome of the experiment shows that, for the same molar ratio of compound of the formula (IV) with "c=3" and compound of the formula (III) with Y=difunctional, "a=1", and "b=1", it is not possible to carry out a sensible cohydrolysis, since the product contains gel fractions, which must be removed as losses.

Example 4

The branched vinylsiloxane prepared in Example 1 and having a vinyl group concentration of 6.68/kg is equilibrated with a linear siloxane to prepare a branched vinyl polymer. This is done by mixing 32.5 g of this product with 520 g of a methyl-terminated silicone oil with a viscosity of 5000 mm²/s, and equilibrating the mixture at 120° C. with catalysis by 0.1 g of PNCl$_2$. After 2 hours, the catalyst is deactivated with sodium acetate. The crude product is freed from volatile constituents under vacuum at 140° C. and then filtered. This gives a clear, colorless silicone oil having a viscosity of 210 mm²/s and an iodine number of 10.3.

The invention claimed is:

1. A liquid organopolysiloxane compound having a viscosity of about 10 to about 10,000,000 mPa·s, and containing per molecule at least one structural unit of the formula $$O_{3-a/2}R_aSi-Y(SiR_aO_{3-a/2})_b \qquad (I)$$

where
R each are identical or different and are a monovalent SiC-bonded methyl, ethyl, phenyl, allyl, or vinyl radical which
Y is a divalent to dodecavalent organic radical which has 1 to 30 C atoms and optionally contains one or more O atoms, wherein the ratio of C atoms in Y to the valence of Y is not more than 3
a is 0 or 1, and
b is an integer from 1 to 11,
further comprising structural elements of the formula $$R^1_cSiO_{4-c/2} \qquad (II)$$

where
R$^1$ each are identical or different and denote a monovalent SiC-bonded methyl, ethyl, phenyl, allyl, or vinyl radical, and
c is 2 or 3.

2. The organopolysiloxane compound of claim 1, wherein Y is a radical having 1 to 24 C atoms, and between two and twelve siloxanyl units.

3. The organopolysiloxane compound of claim 2, wherein Y is divalent, trivalent or tetravalent.

4. The organopolysiloxane compound of claim 2, wherein Y is divalent.

5. The organopolysiloxane compound of claim 1, wherein the molecular ratio of the structural elements (II) to (I) is at least 2.0.

6. The organopolysiloxane compound of claim 1, wherein the molecular ratio of the structural elements (II) to (I) is at least 10.0.

7. The organopolysiloxane compound of claim 1, wherein the molecular ratio of the structural elements (II) to (I) is at least 50.0.

8. A process for preparing an organopolysiloxane compound of claim 1, comprising hydrolyzing compounds of the formula (III)

$$X_{3-a}R_aSi-Y(SiR_aX_{3-a})_b \qquad (III)$$

where X is a hydrolyzable group.

9. The process of claim 8, further comprising cohydrolyzing compounds of the formula (III) with silanes of the formula (IV)

$$R_cSiX_{4-c} \qquad (IV)$$

wherein c is 0, 1, 2, or 3.

10. The process of claim 8, wherein X is selected from the group consisting of halogen radicals, acid radicals, alkoxy radicals, and mixtures thereof.

11. The organopolysiloxane of claim 1, which contains some R which ae aliphatically unsaturated radicals, in amounts of 5 meq/g or less based on the weight of the organopolysiloxane.

12. The organopolysiloxane of claim 1, containing vinyldimethylsiloxy end groups.

13. The organopolysiloxane of claim 1, wherein Y contains no unsaturated groups.

14. The organopolysiloxane of claim 1, wherein at least one Y is selected from the group consisting of methylene, methine, 1,1-ethanediyl, 1,2-ethenediyl, 1,4-butanediyl, and 1,3-butanediyl.

15. The organopolysiloxane of claim 1, wherein Y is a divalent to dodecavalent C$_{1-30}$ hydrocarbon radical.

* * * * *

UNITED STATES PATENT AND TRADEMARK OFFICE
CERTIFICATE OF CORRECTION

PATENT NO.        : 7,888,446 B2
APPLICATION NO.   : 12/063312
DATED             : February 15, 2011
INVENTOR(S)       : Christian Herzig et al.

It is certified that error appears in the above-identified patent and that said Letters Patent is hereby corrected as shown below:

Column 5, Line 29, Claim 1:
After "vinyl radical" delete "which".

Column 6, Line 31, Claim 11:
After "R which" delete "ae"
And insert -- are --.

Signed and Sealed this
Twenty-sixth Day of April, 2011

David J. Kappos
*Director of the United States Patent and Trademark Office*